H. FOLSOM,

Assignor to FOLSOM SOLE SEWING MACHINE CO.

SHOE SEWING MACHINE.

No. 9,791. Reissued July 5, 1881.

Witnesses:

E. A. Hemmenway

Walter E. Lombard

Inventor:

Hannibal Folsom by N. C. Lombard

Attorney.

UNITED STATES PATENT OFFICE.

HANNIBAL FOLSOM, OF STOUGHTON, MASSACHUSETTS, ASSIGNOR TO FOLSOM SOLE SEWING MACHINE COMPANY, OF NASHUA, N. H.

SHOE-SEWING MACHINE.

SPECIFICATION forming part of Reissued Letters Patent No. 9,791, dated July 5, 1881.

Original No. 227,160, dated May 4, 1880. Application for reissue filed February 8, 1881.

*To all whom it may concern:*

Be it known that I, HANNIBAL FOLSOM, of Stoughton, county of Norfolk, State of Massachusetts, have invented an Improvement in Machines for Sewing Shoes, of which the following description, in connection with the accompanying drawings, is a specification.

This invention relates to sewing-machines especially designed for sewing together the welt and outer sole of boots and shoes.

In this my invention the work-support is flat and its edge is notched, so as to form two projections to extend under and support the edge of the shoe-sole, to extend across the channel and bear against the lip of the channel-flap, while above this notched support, which is made adjustable with relation to the needle and awl, is a laterally-adjustable auxiliary presser-foot, adapted to bear upon the welt in advance of the needle, while at the rear of the needle is the main presser-foot.

By notching the edge of the work-support, as described, to make an open recess for the passage of the awl and needle, I am enabled to dispense with the usual so-called "channel-opener," which, extended upwardly, has to run in the channel in the sole, and which, to guide the work correctly and accurately, requires a deeper channel than should be used for first-class welted work.

By making the support adjustable with relation to the awl and needle, and the auxiliary presser adjustable with relation to the said support, I am enabled to quickly and easily adjust the support and presser in suitable position with relation to the awl and needle to throw the line of stitches at a greater or less distance from the edge of the sole and upper, according to whether a plain or Scotch edge is to be made.

In this my invention I employ two flat-faced horizontal projections below the sole, and bearing against the channel-lip, and above the welt and resting on it are two pressers, one in front of and the other behind the needle and awl; so the said sole-edge and welt are always held firmly about that part of the sole and welt where the stitch is being set.

This my attachment may readily be applied to any usual waxed-thread sewing-machine for so-called "fair-stitch work."

Figure 1:
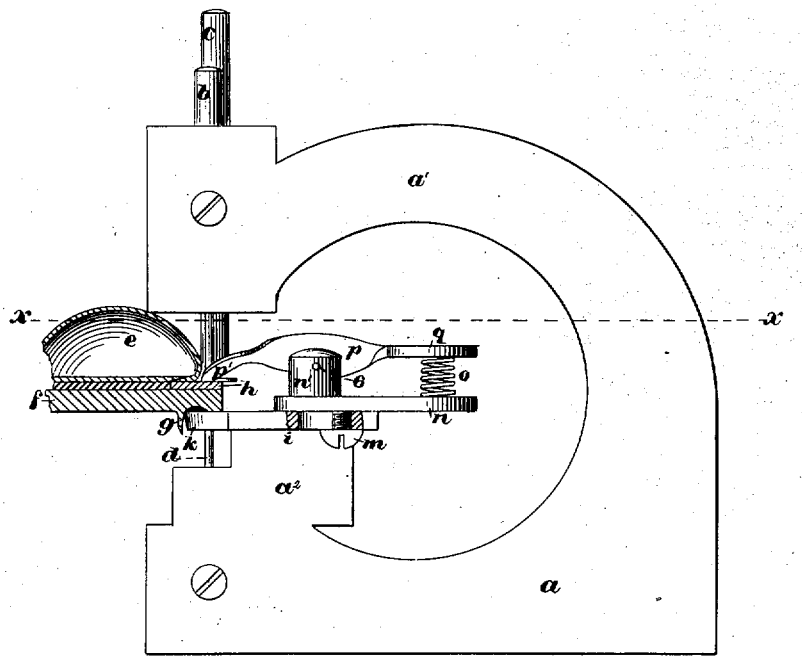
Figure 2:
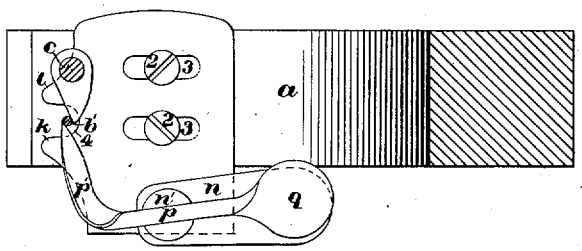

Figure 1 represents, in side elevation, a sufficient portion of a waxed-thread sewing-machine to illustrate my invention, and Fig. 2 a cross-section thereof on the line $x\ x$ of Fig. 1.

The frame-work $a\ a'\ a^2$, awl-bar $b$, presser-bar $c$, and hooked needle $d$ are supposed to be all of the usual construction as these parts may be in practice, and they may be operated by any usual devices.

Part of a shoe to be stitched is shown in Fig. 1, $e$ being the upper; $f$, the outer sole; $g$, the channel-lip, turned down or away from the sole, so that its under side may be borne against by a lip-gage, to be hereinafter described, and $h$ is the welt.

The work-support $i$ is a flat plate, adjustably attached to the frame-work $a^2$ by the screws 2 in the slots 3, and has its outer edge notched, as at 4, to form lateral projections or lip-gages $k\ l$, the notch being partly shown in dotted lines, Fig. 2. These lip-gages, besides aiding in supporting the sole-edge, that portion of which that is outside of the channel resting thereon, also extend across that portion of the sole lifted or displaced to form the so-called "channel" where they bear against the lip $g$, as in Fig. 1, which prevents the said lip from closing, and also enables the lip to co-operate with the parts $k\ l$ to guide the shoe. This construction and arrangement of the flat-surfaced work-support is a great improvement over the supports that project upward in the form of two fingers, and the upper ends of which enter the channel, as in this case the smooth surface of the sole rests upon the work-support, and presents very much less resistance to the feeding of the shoe to the work than when the support is taken directly in the channel, so that the waxed thread comes in contact with the supports.

Adjustably attached to the support, at its upper side, by the screw $m$, and in front of the needle, are the plate $n$ and standard $n'$, upon which is pivoted, at 6, the auxiliary presser $p$, the finger-like end $p'$ of which is extended forward beyond the lip-gage $k$ to bear upon the welt quite close to the point where the awl and needle puncture it, the end $p'$ being held down upon the welt by the spring $o$, acting upon the outer end, $q$, of the auxiliary presser-lever $p$.

By adjusting the auxiliary presser *p* on the support *i* the welt may be stitched, as for a Scotch edge, more or less distant from the upper.

The presser-foot *r*, which rests upon the welt at the rear of the needle and awl, is located above the rearmost lip-gage, *l*, as shown in the drawings, Fig. 2, its outer edge inclining toward the awl *b'*, and shaped as described, and turned back from the work, as shown. The front edge of the presser is kept from rubbing against the upper as the presser-foot is raised and lowered in the usual manner while the shoe is being fed for each stitch. This auxiliary presser, being constant in its action, always bears the same upon the welt to hold it down smooth in advance of the needle and upon the sole to which it is being stitched, while in machines where a single presser is employed the welt is acted upon only at the rear of the needle and after the stitch is made through the welt. My auxiliary presser smooths the welt and lays it close to the sole before it is stitched.

What I claim as new, and desire to secure by Letters Patent of the United States, is—

1. In a sewing-machine for stitching welts and soles, the flat work-supporting plate *i*, provided with the projecting lip-gages *k* and *l*, and arranged relatively to the needle as set forth, and adapted to support the shoe-sole by contact with that portion of said sole which lies outside of the channel, substantially as and for the purposes described.

2. In a sewing-machine for stitching welts and soles, the flat work-supporting plate *i*, provided with the lip-gages *k* and *l*, and adjustably secured to the frame of the machine, with one of said lip-gages in front of the needle, and the other in the rear of the needle, substantially as described.

3. In a sewing-machine for stitching welts and soles, a side-notched flat work-support having lip-gages to bear against the side of the channel flap or lip, combined with an auxiliary pivoted presser arranged to bear on the welt in front of the awl and needle, and the main presser to bear upon the said welt at the rear of the awl and needle, to operate substantially as described.

Executed at Boston, Massachusetts, this 8th day of January, A. D. 1881.

HANNIBAL FOLSOM.

In presence of—
W. E. LOMBARD,
E. E. CHANDLER.